United States Patent
Norige et al.

(10) Patent No.: US 10,063,496 B2
(45) Date of Patent: Aug. 28, 2018

(54) BUFFER SIZING OF A NOC THROUGH MACHINE LEARNING

(71) Applicant: NetSpeed Systems, Inc., San Jose, CA (US)

(72) Inventors: Eric Norige, San Jose, CA (US); Nishant Rao, San Jose, CA (US); Sailesh Kumar, San Jose, CA (US)

(73) Assignee: NETSPEED SYSTEMS INC., San Jose, CA (US)

( * ) Notice: Subject to any disclaimer, the term of this patent is extended or adjusted under 35 U.S.C. 154(b) by 73 days.

(21) Appl. No.: 15/402,819

(22) Filed: Jan. 10, 2017

(65) Prior Publication Data

US 2018/0198738 A1    Jul. 12, 2018

(51) Int. Cl.
H04L 12/861  (2013.01)
H04L 12/24   (2006.01)

(52) U.S. Cl.
CPC .......... *H04L 49/9005* (2013.01); *H04L 41/14* (2013.01)

(58) Field of Classification Search
None
See application file for complete search history.

(56) References Cited

U.S. PATENT DOCUMENTS

| | | |
|---|---|---|
| 4,409,838 A | 10/1983 | Schomberg |
| 4,933,933 A | 6/1990 | Daily et al. |
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |
| 5,563,003 A | 10/1996 | Suzuki et al. |
| 5,583,990 A | 12/1996 | Birrittella et al. |

(Continued)

FOREIGN PATENT DOCUMENTS

| | | |
|---|---|---|
| CN | 103684961 A | 3/2014 |
| JP | 5936793 | 5/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.

(Continued)

*Primary Examiner* — Brian Roberts
(74) *Attorney, Agent, or Firm* — Procopio, Cory, Hargreaves & Savitch LLP

(57) ABSTRACT

The present disclosure is directed to buffer sizing of NoC link buffers by utilizing incremental dynamic optimization and machine learning. A method for configuring buffer depths associated with one or more network on chip (NoC) is disclosed. The method includes deriving characteristics of buffers associated with the one or more NoC, determining first buffer depths of the buffers based on the characteristics derived, obtaining traces based on the characteristics derived, measuring trace skews based on the traces obtained, determining second buffer depths based on the trace skews measured, optimizing the buffer depths associated with the network on chip (NoC) based on the second buffer depths, and configuring the buffer depths associated with one or more network on chip (NoC) based on the buffer depths optimized.

21 Claims, 12 Drawing Sheets

(56) References Cited

U.S. PATENT DOCUMENTS

| | | |
|---|---|---|
| 5,588,152 A | 12/1996 | Dapp et al. |
| 5,764,740 A | 6/1998 | Holender |
| 5,859,981 A | 1/1999 | Levin et al. |
| 5,991,308 A | 11/1999 | Fuhrmann et al. |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,377,543 B1 | 4/2002 | Grover |
| 6,415,282 B1 | 7/2002 | Mukherjea et al. |
| 6,674,720 B1 | 1/2004 | Passint et al. |
| 6,711,717 B2 | 3/2004 | Nystrom et al. |
| 6,778,531 B1 | 8/2004 | Kodialam |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,583,602 B2 | 9/2009 | Bejerano |
| 7,590,959 B2 | 9/2009 | Tanaka |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,098,677 B1 | 1/2012 | Pleshek |
| 8,099,757 B2 | 1/2012 | Riedl et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Komachuk et al. |
| 8,490,110 B2 | 7/2013 | Hoover et al. |
| 8,492,886 B2 | 7/2013 | Or-Bach et al. |
| 8,503,445 B2 | 8/2013 | Lo |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,614,955 B2 | 12/2013 | Gintis |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 9,210,048 B1 | 12/2015 | Marr |
| 9,792,397 B1* | 10/2017 | Nagaraja ............... G06F 17/505 |
| 9,794,145 B2* | 10/2017 | Vasseur .................. H04L 43/08 |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2003/0088602 A1 | 5/2003 | Dutta et al. |
| 2003/0145314 A1 | 7/2003 | Nguyen et al. |
| 2004/0049565 A1 | 3/2004 | Keller et al. |
| 2004/0103218 A1 | 5/2004 | Blumrich et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2006/0002303 A1 | 1/2006 | Bejerano |
| 2006/0031615 A1 | 2/2006 | Bruce et al. |
| 2006/0075169 A1 | 4/2006 | Harris et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0070726 A1 | 3/2009 | Mehrotra et al. |
| 2009/0122703 A1 | 5/2009 | Gangwal et al. |
| 2009/0172304 A1 | 7/2009 | Gueron et al. |
| 2009/0187716 A1 | 7/2009 | Comparan et al. |
| 2009/0187756 A1 | 7/2009 | Nollet et al. |
| 2009/0210184 A1 | 8/2009 | Medardoni et al. |
| 2009/0231348 A1 | 9/2009 | Mejdrich et al. |
| 2009/0268677 A1 | 10/2009 | Chou et al. |
| 2009/0285222 A1 | 11/2009 | Hoover et al. |
| 2009/0300292 A1 | 12/2009 | Fang et al. |
| 2009/0307714 A1 | 12/2009 | Hoover et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0211718 A1 | 8/2010 | Gratz et al. |
| 2010/0223505 A1 | 9/2010 | Andreev et al. |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0085561 A1 | 4/2011 | Ahn |
| 2011/0103799 A1 | 5/2011 | Shacham et al. |
| 2011/0154282 A1 | 6/2011 | Chang et al. |
| 2011/0191774 A1 | 8/2011 | Hsu et al. |
| 2011/0235531 A1 | 9/2011 | Vangal et al. |
| 2011/0276937 A1 | 11/2011 | Waller |
| 2011/0302345 A1 | 12/2011 | Boucard et al. |
| 2011/0307734 A1 | 12/2011 | Boesen et al. |
| 2011/0320854 A1 | 12/2011 | Elrabaa |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |

(56) References Cited

U.S. PATENT DOCUMENTS

| | | |
|---|---|---|
| 2012/0144065 A1 | 6/2012 | Parker |
| 2012/0155250 A1 | 6/2012 | Carney et al. |
| 2012/0173846 A1 | 7/2012 | Wang et al. |
| 2012/0195321 A1 | 8/2012 | Ramanujam |
| 2012/0209944 A1 | 8/2012 | Mejdrich et al. |
| 2013/0028090 A1 | 1/2013 | Yamaguchi et al. |
| 2013/0028261 A1 | 1/2013 | Lee |
| 2013/0051397 A1* | 2/2013 | Guo ............... H04L 45/00 370/400 |
| 2013/0054811 A1 | 2/2013 | Harrand |
| 2013/0080073 A1 | 3/2013 | de Corral |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0191572 A1 | 7/2013 | Nooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0326458 A1 | 12/2013 | Kazda et al. |
| 2014/0068132 A1 | 3/2014 | Philip et al. |
| 2014/0068134 A1 | 3/2014 | Philip et al. |
| 2014/0082237 A1 | 3/2014 | Wertheimer |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0211622 A1 | 7/2014 | Kumar et al. |
| 2014/0254388 A1 | 9/2014 | Kumar et al. |
| 2015/0036536 A1* | 2/2015 | Kumar ............... H04L 41/12 370/254 |
| 2015/0043575 A1 | 2/2015 | Kumar et al. |
| 2015/0109024 A1 | 4/2015 | Abdelfattah et al. |
| 2015/0159330 A1 | 6/2015 | Weisman et al. |
| 2015/0331831 A1 | 11/2015 | Solihin |
| 2017/0061053 A1 | 3/2017 | Kumar et al. |
| 2017/0063625 A1 | 3/2017 | Philip et al. |
| 2017/0063697 A1 | 3/2017 | Kumar |
| 2017/0063734 A1* | 3/2017 | Kumar ............... H04L 49/9005 |

FOREIGN PATENT DOCUMENTS

| | | |
|---|---|---|
| JP | 6060316 B2 | 1/2017 |
| KR | 10-2013-0033898 A1 | 4/2013 |
| KR | 101652490 | 8/2016 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.
Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.
Das, R., et al., Aergia: Exploiting Packet Latency Slack in On-Chip Networks, 37th International Symposium on Computer Architecture (ISCA '10), Jun. 19-23, 2010, 11 pgs.
Ebrahimi, E., et al., Fairness via Source Throttling: A Configurable and High-Performance Fairness Substrate for Multi-Core Memory Systems, ASPLOS '10, Mar. 13-17, 2010, 12 pgs.
Gindin, R., et al., NoC-Based FPGA: Architecture and Routing, Proceedings of the First International Symposium on Networks-on-Chip (NOCS'07), May 2007, pp. 253-262.
Grot, B., Preemptive Virtual Clock: A Flexible, Efficient, and Cost-Effective QOS Scheme for Networks-on-Chip, Micro '09, Dec. 12-16, 2009, 12 pgs.
Grot, B., Kilo-NOG: A Heterogeneous Network-on-Chip Architecture for Scalability and Service Guarantees, ISCA 11, Jun. 4-8, 2011, 12 pgs.
Grot, B., Topology-Aware Quality-of-Service Support in Highly Integrated Chip Multiprocessors, 6th Annual Workshop on the Interaction between Operating Systems and Computer Architecture, Jun. 2006, 11 pgs.
Hestness, J., et al., Netrace: Dependency-Tracking for Efficient Network-on-Chip Experimentation, The University of Texas at Austin, Dept. of Computer Science, May 2011, 20 pgs.
Jiang, N., et al., Performance Implications of Age-Based Allocations in On-Chip Networks, CVA MEMO 129, May 24, 2011, 21 pgs.
Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al. Approximating Age-Based Arbitration in On-Chip Networks, PACT '10, Sep. 11-15, 2010, 2 pgs.
Li, B. et al., CoQoS: Coordinating QoS-Aware Shared Resources in NoC-based SoCs, J. Parallel Distrib. Comput., 71 (5), May 2011, 14 pgs.
Lin, S., et al., Scalable Connection-Based Flow Control Scheme for Application-Specific Network-on-Chip, The Journal of China Universities of Posts and Telecommunications, Dec. 2011, 18(6), pp. 98-105.
Bolotin, Evgency, et al., "QNoC: QoS Architecture and Design Process for Network on Chip" 2004, 24 pages, Journal of Systems Architecture 50 (2004) 105-128 Elsevier.
Holsmark, Shashi Kumar Rickard, et al., "HiRA: A Methodology for Deadlock Free Routing in Hierarchical Networks on Chip", 10 pages, (978-1-4244-4143-3/09 2009 IEEE).
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Rajesh BV, Shivaputra, "NOC: Design and Implementation of Hardware Network Interface With Improved Communication Reliability", 7 pages, International Journal of VLSI and Embedded Systems, IJIVES (vol. 04, Article 06116; Jun. 2013).
Yang, J., et al., Homogeneous NoC-based FPGA: The Foundation for Virtual FPGA, 10th IEEE International Conference on Computer and Information Technology (CIT 2010), Jun. 2010, pp. 62-67.
Zaman, Aanam, "Formal Verification of Circuit-Switched Network on Chip (NoC) Architectures using SPIN", Oosman Hasan, IEEE © 2014, 8 pages.
Benini, Luca, et al., "Networks on Chips: A New SoC Paradigm", IEEE Computers, Soc Designs, pp. 70-78, Copyright 2002 IEEE. 0018-9162/02.
Sethuraman, Ranga Vemuri Balasubramanian, "optiMap: A Tool for Automated Generation of NoC Architecture Using Multi-Port Routers for FPGAs", IEEE, pp. 1-6, 2006.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.

(56) References Cited

OTHER PUBLICATIONS

International Search Report and Written Opinion for PCT/US2014/023625, dated Jul. 10, 2014, 9 pgs.
International Preliminary Report on Patentability for International Application No. PCT/US2013/064140, dated Apr. 23, 2015, 6 pages.
Office Action for Korean Patent Application No. 10-2016-7019093 dated Sep. 8, 2016, 3 pages plus 1 page English translation KIPO, Korea.
Notice of Allowance for for Korean Patent Application No. 10-2016-7019093 dated Dec. 5, 2016, 5 pages. KIPO, Korea.
International Search Report and Written Opinion for PCT/US2014/037902, dated Sep. 30, 2014, 14 pgs.
Office Action for Japanese Patent Application No. 2015-535898 dated Oct. 25, 2016, 2 pages English, 2 pages untranslated copy. Japan Patent Office.
Notice of Grant for Japanese Patent Application No. 2015-535898 dated Jan. 17, 2017, 3 pages, untranslated. Japan Patent Office.
International Search Report and Written Opinion for PCT/US2014/048190, dated Nov. 28, 2014, 11 pgs.
Office Action for Japanese Patent Application No. 2016-516030 dated Aug. 30, 2016, 2 pages, Japan Patent Office.
Decision to Grant for Japanese Patent Application No. 2016-516030 dated Nov. 22, 2016, 3 pages, untranslated, Japan Patent Office.

\* cited by examiner

1100

| | Buffer | 1 | 2 | 3 | 4 | 5 | ... | N |
|---|---|---|---|---|---|---|---|---|
| Round 0 | Input Size | 3 | 5 | 5 | 6 | 10 | ... | 6 |
| | $f_{01}\ \&\ c_{01}$ | 2 | 5 | - | - | - | ... | 6 |
| | $f_{02}\ \&\ c_{02}$ | 3 | 4 | - | - | - | ... | 6 |
| | ⋮ | ⋮ | ⋮ | ⋮ | ⋮ | ⋮ | ⋮ | ⋮ |
| | $f_{0n}\ \&\ c_{0n}$ | 3 | 5 | - | - | - | ... | 5 |
| Round 1 | Input Size | 2 | 4 | 5 | 6 | 10 | ... | 5 |
| | $f_{11}\ \&\ c_{11}$ | 1 | 4 | 5 | 6 | 10 | ... | 5 |
| | $f_{12}\ \&\ c_{12}$ | 2 | 3 | 5 | 6 | 10 | ... | 5 |
| | ⋮ | ⋮ | ⋮ | ⋮ | ⋮ | ⋮ | ⋮ | ⋮ |
| | $f_{1n}\ \&\ c_{1n}$ | 2 | 4 | 5 | 6 | 10 | ... | 5 | f = Performance Parameter Function (Latency / Bandwidth / Tradeoff between the Bandwidth and Cost, etc.)

c = Cost of the Switching Element (Based on the Number of Buffers)

FIG. 11

BUFFER SIZING OF A NOC THROUGH MACHINE LEARNING

TECHNICAL FIELD

Methods and example implementations described herein are generally directed to data communication systems, and more specifically, to sizing of flow control buffers of a network on chip (NoC) in data communication systems.

RELATED ART

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this disclosure, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1A), 2-D (two dimensional) mesh (as shown in FIG. 1B), and 2-D Taurus (as shown in FIG. 1C) are examples of topologies in the related art. Mesh and Taurus can also be extended to 2.5-D (two and half dimensional) or 3-D (three dimensional) organizations. FIG. 1D shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has its ports used, one connecting to the router 112 at the top layer and another connecting to the router 110 at the bottom layer. Routers 110 and 112 are at the bottom and top mesh layers respectively and therefore have only the upper facing port 113 and the lower facing port 114 respectively connected.

Packets are message transport units for intercommunication between various components. Routing involves identifying a path that is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2A pictorially illustrates an example of XY routing in a two dimensional mesh. More specifically, FIG. 2A illustrates XY routing from node '34' to node '00'. In the example of FIG. 2A, each component is connected to only one port of one router. A packet is first routed over the X-axis until the packet reaches node '04' where the X-coordinate of the node is the same as the X-coordinate of the destination node. The packet is next routed over the Y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

In an example, a NoC interconnect is generated from a specification by utilizing design tools. The specification can contain constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections, etc depending on the desired implementation. Specifications can also be in the form of power specifications to define power domains, voltage domains, clock domains, and so on, depending on the desired implementation.

NoC interconnects may employ wormhole routing, wherein, a large message or packet is broken into small pieces known as flits (also referred to as flow control digits). The first flit is a header flit, which holds information about this packet's route and key message level info along with payload data and sets up the routing behavior for all subsequent flits associated with the message. Optionally, one or more body flits follows the header flit, containing remaining payload of data. The final flit is a tail flit, which, in addition to containing last payload, also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there exist multiple route paths of equal length or number of hops between any pair of source and destination nodes. For example, in FIG. 2B, in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3A illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present disclosure will utilize such a horizontal left and right illustration for multi-layer NoC to differentiate from the 3D NoCs, which are illustrated by drawing the NoCs vertically over each other.

In FIG. 3B, a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

Lines between the routers are NoC links or channels, wherein each router/node receives packets from the component and/or the port it corresponds to (or transmits packets received from outside to the target port). Based on the address indicated in each packet, the routers forward the received packet to the port attached to it or to the port of another shared link. While the packets are routed form source to destination, the receiver end of the link has a buffering mechanism to make sure the packets are received and are buffered to make a full control back to the transmitting end of the link. Generally, the receiver end of the link and the transmitting end of the link are not always in sync. Thus, in order to ensure proper working of the NoC, the buffering mechanism may have to work well. A buffer contains data/packet that is stored for a short amount of time, typically in the computer's memory (RAM). The purpose of a buffer is to hold data before it is used. The buffer allows each device or process to operate without being held up by the other.

Similar to a cache, the buffer also act as a holding place for packets however, like cache it does not accelerate the speed of any activity as to support the coordination of separate activities. In order for a buffer to be effective, size of the buffer and algorithms for moving data into and out of the buffer need to be considered by the buffer designer. However, size of buffer has a direct impact on performance of a machine or of a network. Having a large buffer size for communication channels/links can affect performance cost, of machine or network, by utilizing extra power for the maintenance of large-sized buffer. Even when such large size buffer is not in use, it still consumes resources of the machine or the network and some amount of the power, also sometime referred to as leakage power, is thereby consumed for maintenance of such a buffer. Also, maintaining a small sized buffer during communication directly affects performance of communication channel by providing little to no lag between packet processing and communication.

In large scale networks such as the Internet, with an advantage of holding packets during continuous communication, maintaining varying sizes of buffers are of a lesser concern. However, such varying sizes of buffers are too expensive in terms of power, area, and speed to implement on interconnection networks, where the primary demands include low latency and high performance.

In such systems, the sizing of flow control buffers, specifically in NoC communication infrastructure, is a major concern. In the related art, there is no solution for buffer sizing of NoC channels, and system designers may utilize varying sizes of buffer for each channel based on requirement of the channel and keep on varying channel buffer sizes with new application into picture. However, as the complexity of NoC increases, difficulty of varying sizes of the buffer for each channel also increases.

Therefore, there exists a need for methods, systems, and computer readable mediums for sizing of flow control buffers that can be used by communication mechanism for communication between SoCs/NoCs.

SUMMARY

Aspects of the present disclosure relate to methods, systems, and computer readable mediums for buffer sizing of a Network on Chip (NoC) link buffers. Such buffer sizing can be achieved by utilizing incremental dynamic optimization and machine learning. An aspect of the present disclosure relates to a method for generating a Network on Chip (NoC), wherein the method can execute a first process directed to determination of arrival and departure characteristics of at least one buffer associated with the NoC. The first process can be a machine learning based process that can be configured to determine arrival rate of packets and drain rate of packets based on an arbitration process of the NoC. The method of the present disclosure can further execute a second process directed to determine/derive at least one buffer depth of the at least one buffer based on arrival and departure characteristics, and one or more characteristics of the NoC. The method of the present disclosure can further include the generating the NoC based on the at least one buffer depth.

In an example implementation, arrival and departure characteristics can be selected from any or a combination of arrival rate of packets, burst size, round trip time (RTT), multicast packet size, drain rate of packets, store and forward feature(s)/attributes, and arbitration frequency/link frequency.

In an aspect, method of the present disclosure can include the steps of executing a third process directed to optimize the at least one buffer depth to generate at least one second buffer depth through a first simulation of the NoC in isolation with the at least one buffer associated with the NoC, and executing a fourth process to optimize the at least one second buffer depth to generate at least one third buffer depth through a second simulation of the NoC and at least one system element associated with the NoC. The method of the present disclosure can then be used to generate the NoC based on the at least one third buffer depth.

In an example implementation, the first simulation can generate an input trace behavior based on historical output trace behavior associated with at least one other NoC adjacent to the NoC.

In an aspect, the fourth process of the present disclosure can select the at least one buffer to decrease the at least one buffer depth based on a cost function, and wherein the decrease in the at least one buffer depth can be performed repeatedly until a threshold is achieved for the cost function.

In an aspect, the fourth process of the present disclosure can create a probability distribution of the at least one buffer depth for the at least one buffer based on the at least one second buffer depth, conduct one or more second simulations based on a sampling of the probability distribution of the at least one buffer depth, rank the one or more second simulations based on a cost function, and obtain the at least one third buffer depth for at least one buffer from the one or more second simulations ranked upon occurrence of a probability distribution convergence.

In an example implementation, the one or more characteristics of the NoC can include at least one trace skew.

In an example implementation, the at least one second process is a machine learning based process configured to select the at least one buffer depth to generate the at least one second buffer depth for optimization based on the at least one trace skew.

In an aspect, the present disclosure relates to a system for generation of a Network on Chip (NoC). The system includes a memory coupled to the processor, wherein the memory stores one or more computer programs executable by the processor. The computer programs are executable to execute a first process, wherein the first process derives arrival and departure characteristics of at least one buffer associated with the NoC, execute a second process wherein the second process derives at least one buffer depth of the at least one buffer based on the arrival and the departure characteristics and one or more characteristics of the NoC, and generate the NoC based on the at least one buffer depth. In an aspect, the first process can be a machine learning based process configured to determine arrival rate of packets and drain rate of packets based on arbitration processes of the NoC.

In an example implementation, arrival and departure characteristics are selected from any or a combination of arrival rate of packets, burst size, round trip time (RTT), multicast packet size, drain rate of packets, store and forward feature(s), and arbitration frequency/link frequency.

In an example implementation, computer programs of the present disclosure are further executable to execute a third process that optimizes the at least one buffer depth to generate at least one second buffer depth through a first simulation of the NoC in isolation with the at least one buffer associated with the NoC, and execute a fourth process that optimizes the at least one second buffer depth to generate at least one third buffer depth through a second simulation of the NoC and at least one system element associated with the NoC.

In an aspect, the NoC generated based on the at least one buffer depth can be based on the at least one third buffer depth.

In an aspect, the first simulation can be adapted to generate an input trace behavior based on historical output trace behavior associated with at least one other NoC adjacent to the NoC.

In an aspect, the fourth process can select the at least one buffer to decrease the at least one buffer depth based on a cost function, and wherein the decrease in the at least one buffer depth can be performed repeatedly until a threshold is achieved for the cost function.

In an aspect, the fourth process can create a probability distribution of the at least one buffer depth for the at least one buffer based on the at least one second buffer depth, conduct one or more second simulations based on a sampling of the probability distribution of the at least one buffer depth, rank the one or more second simulations based on a cost function, and obtain the at least one third buffer depth for at least one buffer from the one or more second simulations ranked upon occurrence of a probability distribution convergence.

In an example implementation the one or more characteristics of the NoC comprises at least one trace skew.

In an example implementation, the at least one second process can be a machine learning based process configured to select the at least one buffer depth to generate the at least one second buffer depth for optimization based on the at least one trace skew.

In an aspect, the present disclosure relates to a non-transitory computer readable storage medium storing instructions for executing a process. The instructions execute a first process directed to derivation/determination of arrival and departure characteristics of at least one buffer associated with the NoC, execute a second process directed to determination/derivation of at least one buffer depth of the at least one buffer based on the arrival and the departure characteristics and one or more characteristics of the NoC, and generating the NoC based on the at least one buffer depth, wherein the first process is a machine learning based process configured to determine arrival rate of packets and drain rate of packets based on arbitration processes of the NoC.

In an aspect, the present disclosure relates to a method for performing sizing for a buffer associated with a network on chip (NoC). The method can include determining a first optimal size of the buffer based on one or more characteristics of the buffer, wherein the one or more characteristics of the buffer are selected from any or a combination of arrival rate of packets, burst size, round trip time (RTT), multicast packet size, drain rate of packets, store and forward feature, and arbitration frequency/link frequency. The method can further include optimizing buffer size based on the first optimal size, and performing sizing of the buffer based on the optimized buffer size.

In an example implementation, the one or more characteristics of the buffer can be obtained based on machine learning that can be adapted to determine arrival rate of the packets and drain rate of the packets using an arbitration process of the NoC.

In an example implementation, the one or more characteristics of the buffer can be obtained based on machine learning that can be adapted to determine arrival characteristics and departure characteristics of the buffer.

In an aspect, the method can further a second optimal size of the buffer based on at least one packet trace of a communication associated with the buffer, wherein the optimizing the buffer size can be performed based on a combination of the first optimal size and the second optimal size.

In an aspect, the method can further configure a physical system on a chip (SoC) with the NoC having the buffer with optimized buffer size.

In an aspect, optimizing the buffer size can include varying the buffer size for the buffer based on a cost function to attain a threshold for the cost function, wherein the cost function can be selected from any or a combination of bandwidth function or latency function or tradeoff function, and thereby obtain the optimal size for the buffer based on the threshold attained.

In an aspect, optimizing the buffer size can include creating a probability distribution of the buffer size for the buffer based on the first optimal size, performing one or more simulations based on sampling of the probability distribution, ranking the one or more simulations based on a cost function calculated for each simulation, wherein the cost function can be selected from any or a combination of bandwidth function or latency function or tradeoff function, and thereby obtaining the optimal size for the buffer from the simulations ranked upon occurrence of a probability distribution convergence.

BRIEF DESCRIPTION OF DRAWINGS

FIG. 11 illustrates an example plot obtained for brute force method for optimizing the buffer size, in accordance with an example implementation.

DETAILED DESCRIPTION

Figure 1A:
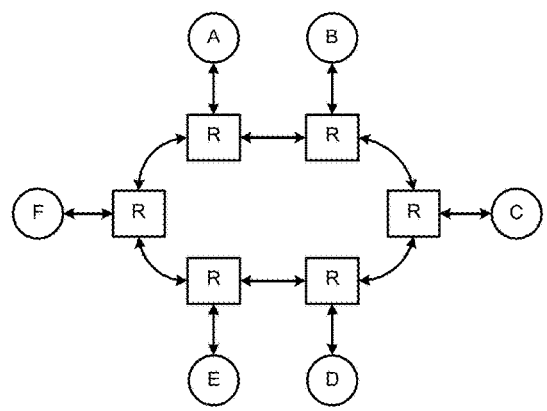
FIGS. 1A, 1B, 1C, and 1D illustrate examples of Bidirectional ring, 2D Mesh, 2D Taurus, and 3D Mesh NoC Topologies.
Figure 1B:
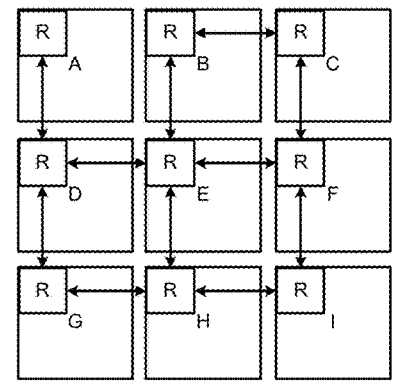
Figure 1C:
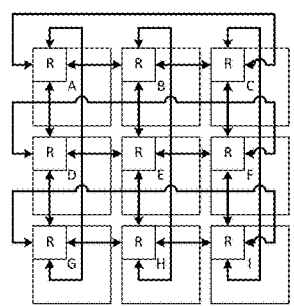
Figure 1D:
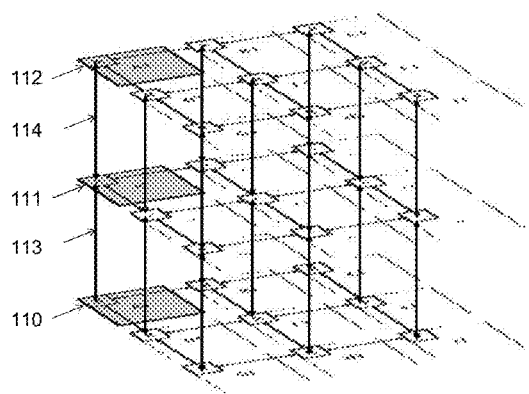
Figure 2A:
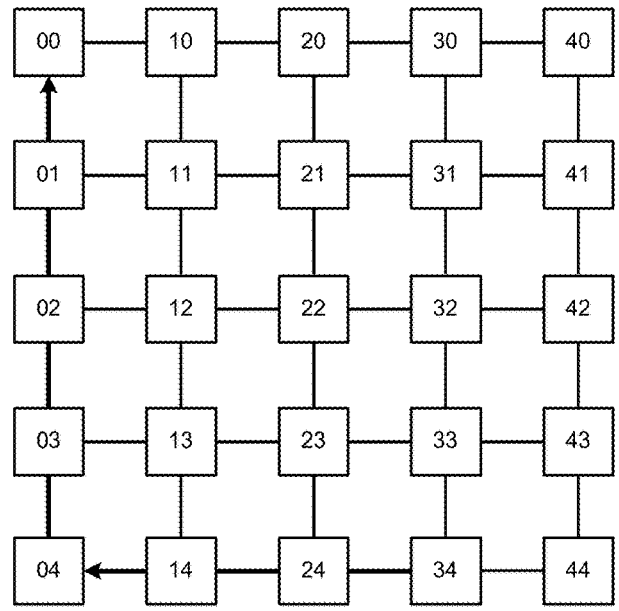
FIG. 2A illustrates an example of XY routing in a related art two dimensional mesh.
Figure 2B:
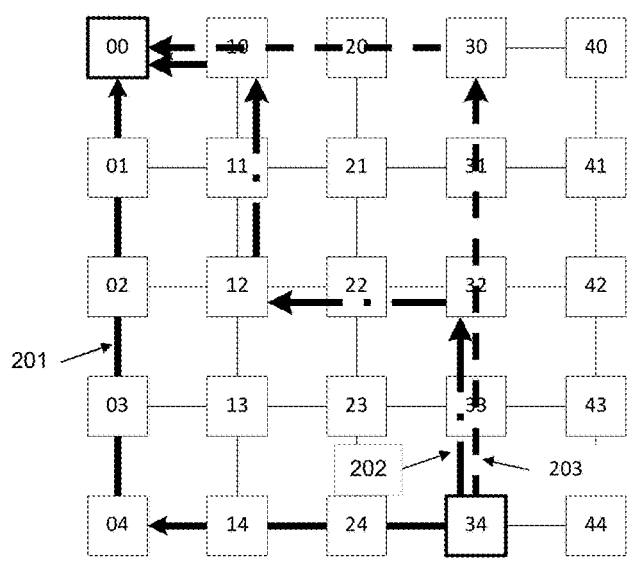
FIG. 2B illustrates three different routes between a source and destination nodes.

The following detailed description provides further details of the figures and example implementations of the present disclosure. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present disclosure. Example implementations may also be conducted singularly, or in combination with any other example implementation of the present disclosure, according to the desired implementations.

In the present disclosure the term "buffer depth" and "buffer size" or "buffer depths" and "buffer sizes" are interchangeably used. It may be noted by the person skilled in the art that the terms have similar logical meaning as the storage space provided by a buffer and the terms used throughout the description are provided as examples and are not intended to be limiting.

Network-on-Chip (NoC) has emerged as a paradigm to interconnect a large number of components on the chip. NoC is a global shared communication infrastructure made up of several routing nodes interconnected with each other using point-to-point physical links. In example implementations, a NoC interconnect is generated from a specification by utilizing design tools. The specification can include constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections, etc. depending on the desired implementation. Specifications can also be in the form of power specifications to define power domains, voltage domains, clock domains, and so on, depending on the desired implementation.

Example implementations are directed to the utilization of machine learning based algorithms. In the related art, a wide range of machine learning based algorithms have been applied to image or pattern recognition, such as the recognition of obstacles or traffic signs of other cars, or the categorization of elements based on a specific training. In view of the advancement in power computations, machine learning has become more applicable for the generation of NoCs and for the mapping of traffic flows of NoCs.

Aspects of the present disclosure relate to methods, systems, and computer readable mediums for buffer sizing of a Network on Chip (NoC) link buffers. Such buffer sizing can be achieved by utilizing incremental dynamic optimization and machine learning. An aspect of the present disclosure relates to a method for generating a Network on Chip (NoC), wherein the method can execute a first process directed to determination of arrival and departure characteristics of at least one buffer associated with the NoC. The first process can be a machine learning based process that can be configured to determine arrival rate of packets and drain rate of packets based on an arbitration process of the NoC. The method of the present disclosure can further execute a second process directed to determine/derive at least one buffer depth of the at least one buffer based on arrival and departure characteristics, and one or more characteristics of the NoC. The method of the present disclosure can further include the generating the NoC based on the at least one buffer depth.

In an example implementation, arrival and departure characteristics can be selected from any or a combination of arrival rate of packets, burst size, round trip time (RTT), multicast packet size, drain rate of packets, store and forward feature(s)/attributes, and arbitration frequency/link frequency.

In an aspect, method of the present disclosure can include the steps of executing a third process directed to optimize the at least one buffer depth to generate at least one second buffer depth through a first simulation of the NoC in isolation with the at least one buffer associated with the NoC, and executing a fourth process to optimize the at least one second buffer depth to generate at least one third buffer depth through a second simulation of the NoC and at least one system element associated with the NoC. The method of the present disclosure can then be used to generate the NoC based on the at least one third buffer depth.

In an example implementation, the first simulation can generate an input trace behavior based on historical output trace behavior associated with at least one other NoC adjacent to the NoC.

In an aspect, the fourth process of the present disclosure can select the at least one buffer to decrease the at least one buffer depth based on a cost function, and wherein the decrease in the at least one buffer depth can be performed repeatedly until a threshold is achieved for the cost function.

In an aspect, the fourth process of the present disclosure can create a probability distribution of the at least one buffer depth for the at least one buffer based on the at least one second buffer depth, conduct one or more second simulations based on a sampling of the probability distribution of the at least one buffer depth, rank the one or more second simulations based on a cost function, and obtain the at least one third buffer depth for at least one buffer from the one or more second simulations ranked upon occurrence of a probability distribution convergence.

In an example implementation, the one or more characteristics of the NoC can include at least one trace skew.

In an example implementation, the at least one second process is a machine learning based process configured to select the at least one buffer depth to generate the at least one second buffer depth for optimization based on the at least one trace skew.

In an aspect, the present disclosure relates to a system for generation of a Network on Chip (NoC). The system includes a memory coupled to the processor, wherein the memory stores one or more computer programs executable by the processor. The computer programs are executable to execute a first process, wherein the first process derives arrival and departure characteristics of at least one buffer associated with the NoC, execute a second process wherein the second process derives at least one buffer depth of the at least one buffer based on the arrival and the departure characteristics and one or more characteristics of the NoC, and generate the NoC based on the at least one buffer depth. In an aspect, the first process can be a machine learning based process configured to determine arrival rate of packets and drain rate of packets based on arbitration processes of the NoC.

In an example implementation, arrival and departure characteristics are selected from any or a combination of arrival rate of packets, burst size, round trip time (RTT), multicast packet size, drain rate of packets, store and forward feature(s), and arbitration frequency/link frequency.

In an example implementation, computer programs of the present disclosure are further executable to execute a third process that optimizes the at least one buffer depth to generate at least one second buffer depth through a first simulation of the NoC in isolation with the at least one buffer associated with the NoC, and execute a fourth process that optimizes the at least one second buffer depth to generate at least one third buffer depth through a second simulation of the NoC and at least one system element associated with the NoC.

In an aspect, the NoC generated based on the at least one buffer depth can be based on the at least one third buffer depth.

In an aspect, the first simulation can be adapted to generate an input trace behavior based on historical output trace behavior associated with at least one other NoC adjacent to the NoC.

In an aspect, the fourth process can select the at least one buffer to decrease the at least one buffer depth based on a cost function, and wherein the decrease in the at least one buffer depth can be performed repeatedly until a threshold is achieved for the cost function.

In an aspect, the fourth process can create a probability distribution of the at least one buffer depth for the at least one buffer based on the at least one second buffer depth, conduct one or more second simulations based on a sampling of the probability distribution of the at least one buffer depth, rank the one or more second simulations based on a cost function, and obtain the at least one third buffer depth for at least one buffer from the one or more second simulations ranked upon occurrence of a probability distribution convergence.

In an example implementation the one or more characteristics of the NoC comprises at least one trace skew.

In an example implementation, the at least one second process can be a machine learning based process configured to select the at least one buffer depth to generate the at least one second buffer depth for optimization based on the at least one trace skew.

In an aspect, the present disclosure relates to a non-transitory computer readable storage medium storing instructions for executing a process. The instructions execute a first process directed to derivation/determination of arrival and departure characteristics of at least one buffer associated with the NoC, execute a second process directed to determination/derivation of at least one buffer depth of the at least one buffer based on the arrival and the departure characteristics and one or more characteristics of the NoC, and generating the NoC based on the at least one buffer depth, wherein the first process is a machine learning based process configured to determine arrival rate of packets and drain rate of packets based on arbitration processes of the NoC.

In an aspect, the present disclosure relates to a method for performing sizing for a buffer associated with a network on chip (NoC). The method can include determining a first optimal size of the buffer based on one or more characteristics of the buffer, wherein the one or more characteristics of the buffer are selected from any or a combination of arrival rate of packets, burst size, round trip time (RTT), multicast packet size, drain rate of packets, store and forward feature, and arbitration frequency/link frequency. The method can further include optimizing buffer size based on the first optimal size, and performing sizing of the buffer based on the optimized buffer size.

In an example implementation, the one or more characteristics of the buffer can be obtained based on machine learning that can be adapted to determine arrival rate of the packets and drain rate of the packets using an arbitration process of the NoC.

In an example implementation, the one or more characteristics of the buffer can be obtained based on machine learning that can be adapted to determine arrival characteristics and departure characteristics of the buffer.

In an aspect, the method can further a second optimal size of the buffer based on at least one packet trace of a communication associated with the buffer, wherein the optimizing the buffer size can be performed based on a combination of the first optimal size and the second optimal size.

In an aspect, the method can further configure a physical system on a chip (SoC) with the NoC having the buffer with optimized buffer size.

In an aspect, the optimizing the buffer size can include varying the buffer size for the buffer based on a cost function to attain a threshold for the cost function, wherein the cost function can be selected from any or a combination of bandwidth function or latency function or tradeoff function, and thereby obtain the optimal size for the buffer based on the threshold attained.

In an aspect, the optimizing the buffer size can include creating a probability distribution of the buffer size for the buffer based on the first optimal size, performing one or more simulations based on sampling of the probability distribution, ranking the one or more simulations based on a cost function calculated for each simulation, wherein the cost function can be selected from any or a combination of bandwidth function or latency function or tradeoff function, and thereby obtaining the optimal size for the buffer from the simulations ranked upon occurrence of a probability distribution convergence.

In an aspect, the present disclosure relates to a method for performing sizing for a buffer associated with a network on chip (NoC). The method can determine a first optimal size of the buffer based on one or more characteristics of the buffer, wherein the one or more characteristics of the buffer are selected from any or a combination of arrival rate of packets, burst size, round trip time (RTT), multicast packet size, drain rate of packets, store and forward feature, and arbitration frequency/link frequency. The can optimize buffer size based on the first optimal size. The method can further perform sizing of the buffer based on the optimized buffer size.

In an example implementation, the one or more characteristics of the buffer are obtained based on machine learning that is adapted to determine the arrival rate of the packets and the drain rate of the packets using an arbitration process of the NoC.

In an example implementation, the one or more characteristics of the buffer are obtained based on machine learning that is adapted to determine arrival characteristics and departure characteristics of the buffer.

In an aspect, the method can further a second optimal size of the buffer based on at least one packet trace of a communication associated with the buffer, wherein the optimizing the buffer size is performed based on a combination of the first optimal size and the second optimal size.

In an aspect, the method can further configure a physical system on a chip (SoC) with the NoC having the buffer with optimized buffer size.

In an aspect, the method can optimize the buffer size by varying the buffer size for the buffer based on a cost function to attain a threshold for the cost function, wherein the cost function is selected from any or a combination of bandwidth function or latency function or tradeoff function, and thereby obtains the optimal size for the buffer based on the threshold attained.

In an aspect, the method can optimize the buffer size by creating a probability distribution of the buffer size for the buffer based on the first optimal size, performing one or more simulations based on sampling of the probability distribution, ranking the one or more simulations based on a cost function calculated for each simulation, wherein the cost function is selected from any or a combination of bandwidth function or latency function or tradeoff function, and thereby obtaining the optimal size for the buffer from the simulations ranked upon occurrence of a probability distribution convergence.

In an aspect, the present disclosure relates to a method for performing sizing for a buffer associated with a network on chip (NoC). The method can determine an optimal size of the buffer based on at least one packet trace of a communication associated with the buffer, optimize buffer size based on the optimal size, and perform sizing of the buffer based on the optimized buffer size.

In an example implementation, the at least one packet trace comprises a cycle that is selected from any of an empty cycle or a cycle with respect to destination and any of start of packet (SOP) or end of packet (EOP).

In an example implementation, the at least one packet trace is obtained by performing simulation on one or more characteristics of the buffer, wherein the one or more characteristics of the buffer are selected from any or a combination of arrival rate of packets, burst size, round trip time (RTT), multicast packet size, drain rate of packets, store and forward feature, and arbitration frequency/link frequency.

In an aspect, the method can obtain the optimal size by adjusting length of a virtual channel (VC) associated with the NoC, wherein the VC is identified based on machine learning.

In an aspect, the method can optimize the buffer size by varying the buffer size for the buffer based on a cost function to attain a threshold for the cost function, wherein the cost function is selected from any or a combination of bandwidth function or latency function or tradeoff function, and obtaining the optimal size for the buffer based on the threshold attained.

In an aspect, the method can optimize the buffer size by creating a probability distribution of the buffer size for the buffer based on the optimal size, performing one or more simulations based on sampling of the probability distribution, ranking the one or more simulations based on a cost function calculated for each simulation, wherein the cost function is selected from any or a combination of bandwidth function or latency function or tradeoff function, and obtaining the optimal size for the buffer from the simulations ranked upon occurrence of a probability distribution convergence.

In an example implementation, the simulations are adapted to generate an input trace behavior based on historical output trace behavior associated with the NoC.

In an aspect, the present disclosure relates to a system having a static characterization module, an optimization module, and a sizing module. The static characterization module determines a first optimal size of the buffer based on one or more characteristics of the buffer, wherein the one or more characteristics of the buffer are selected from any or a combination of arrival rate of packets, burst size, round trip time (RTT), multicast packet size, drain rate of packets, store and forward feature, and arbitration frequency/link frequency. The optimization module optimizes buffer size based on the first optimal size. The sizing module performs sizing of the buffer based on the optimized buffer size.

In an aspect, the optimization module can optimize the buffer size based on a combination of the first optimal size and the second optimal size.

In an aspect, the system can include a configuration module to configure a physical system on a chip (SoC) with the NoC having the buffer with optimized buffer size.

In an aspect, the optimization module can vary the buffer size for the buffer based on a cost function to attain a threshold for the cost function, wherein the cost function is selected from any or a combination of bandwidth function or latency function or tradeoff function, and obtain the optimal size for the buffer based on the threshold attained.

In an aspect, the optimization module can create a probability distribution of the buffer size for the buffer based on the first optimal size, perform one or more simulations based on sampling of the probability distribution, rank the one or more simulations based on a cost function calculated for each simulation, wherein the cost function is selected from any or a combination of bandwidth function or latency function or tradeoff function, and obtain the optimal size for the buffer from the simulations ranked upon occurrence of a probability distribution convergence.

In an aspect, the present disclosure relates to a system having an element level analysis, an optimization module, and a sizing module. The element level analysis module determines an optimal size of the buffer based on at least one packet trace of a communication associated with the buffer. The optimization module configured to optimize buffer size based on the optimal size. The sizing module configured to perform sizing of the buffer based on the optimized buffer size.

In an example implementation, the at least one packet trace comprises a cycle that is selected from any of an empty cycle or a cycle with respect to destination and any of start of packet (SOP) or end of packet (EOP).

In an aspect, the optimization module can vary the buffer size for the buffer based on a cost function to attain a threshold for the cost function, wherein the cost function is selected from any or a combination of bandwidth function or latency function or tradeoff function, and obtain the optimal size for the buffer based on the threshold attained.

In an aspect, the optimization module can create a probability distribution of the buffer size for the buffer based on the optimal size, perform one or more simulations based on sampling of the probability distribution, rank the one or more simulations based on a cost function calculated for each simulation, wherein the cost function is selected from any or a combination of bandwidth function or latency function or tradeoff function, and obtain the optimal size for the buffer from the simulations ranked upon occurrence of a probability distribution convergence.

In an aspect, the present disclosure relates to a non-transitory computer readable storage medium storing instructions for executing a process. The instructions can determine a first optimal size of the buffer based on one or more characteristics of the buffer, wherein the one or more characteristics of the buffer are selected from any or a combination of arrival rate of packets, burst size, round trip time (RTT), multicast packet size, drain rate of packets, store and forward feature, and arbitration frequency/link frequency. The can optimize buffer size based on the first optimal size. The method can further perform sizing of the buffer based on the optimized buffer size.

In an aspect, the present disclosure relates to a non-transitory computer readable storage medium storing instructions for executing a process. The instructions can determine an optimal size of the buffer based on at least one packet trace of a communication associated with the buffer, optimize buffer size based on the optimal size, and perform sizing of the buffer based on the optimized buffer size.

Figure 4:
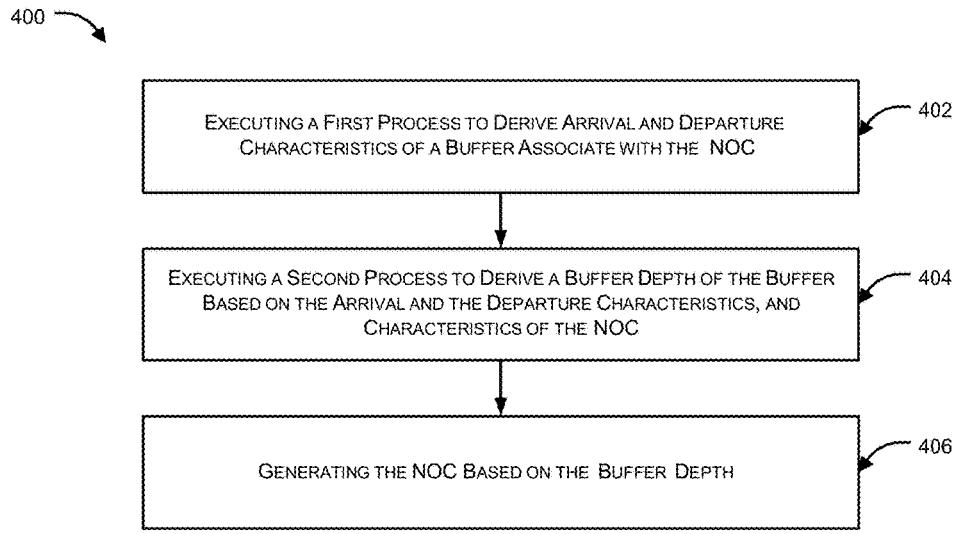
FIG. 4 illustrates an exemplary flow diagram for generating a Network on Chip (NoC) based on buffer depth in accordance with an example implementation.

FIG. 4 illustrates an exemplary flow diagram 400 for generating a Network on Chip (NoC), in accordance with an example implementation. This example process is merely illustrative, and therefore other processes may be substituted as would be understood by those skilled in the art. Further, this process may be modified, by adding, deleting or modifying operations, without departing from the scope of the inventive concept.

As can be seen from the example representation of FIG. 4, at 402, a first process is executed to derive arrival and departure characteristics of at least one buffer associated with the NoC. In an example implementation, the arrival and departure characteristics can be selected from any or a combination of arrival rate of packets, burst size, round trip time (RTT), multicast packet size, drain rate of packets, store and forward feature, and arbitration frequency/link frequency.

In an example implementation, the first process can be a machine learning based process configured to determine arrival rate of packets and drain rate of packets based on arbitration processes of the NoC.

At 404, a second process is executed to derive of at least one buffer depth of the at least one buffer based on the arrival and the departure characteristics (derived at 402), and one or more characteristics of the NoC. In an example implementation, the one or more characteristics of the NoC can include, but are not limited to, at least one trace skew.

In an example implementation, the second process can be a machine learning based process that can be configured to select the at least one buffer depth so as to generate a second buffer depth for optimization based on the at least one trace skew.

At 406, the NoC is generated based on the at least one buffer depth or based on the second buffer depth.

Figure 5:
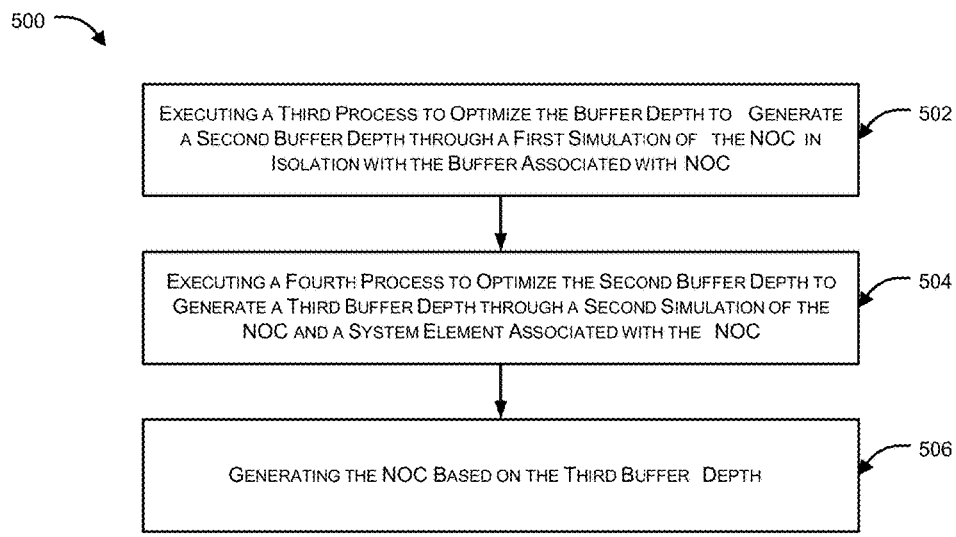
FIG. 5 illustrates another exemplary flow diagram for generating a NoC based on buffer depth in accordance with an example implementation.
Figure 3A:
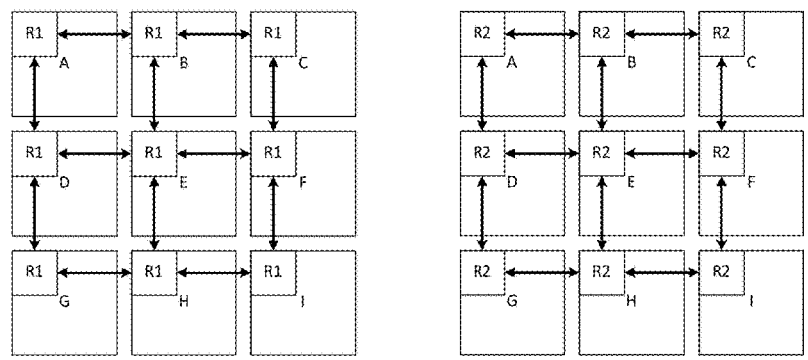
FIG. 3A illustrates an example of a related art two layer NoC interconnect.
Figure 3B:
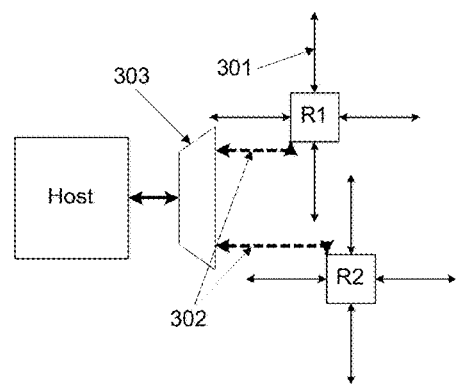
FIG. 3B illustrates the related art bridge logic between host and multiple NoC layers.

FIG. 5 illustrates an exemplary flow diagram 500 for generating the NoC in accordance with an example implementation. This example process is merely illustrative, and therefore other processes may be substituted as would be understood by those skilled in the art. Further, this process may be modified, by adding, deleting or modifying operations, without departing from the scope of the inventive concept.

As can be seen from the example representation of FIG. 5, at 502, a third process can be executed to optimize the at least one buffer depth to generate at least one second buffer depth through a first simulation of the NoC in isolation with the at least one that is buffer associated with the NoC. In an example implementation, the first simulation can be adapted to generate an input trace behavior based on historical output trace behavior associated with one or more other NoCs that may be adjacent to the NoC.

At 504, a fourth process can be executed so as to optimize the at least one second buffer depth and generate at least one third buffer depth through a second simulation of the NoC and at least one system element associated with the NoC.

In an example implementation, the fourth process can select the at least one buffer to decrease the at least one buffer depth based on a cost function, and wherein the decrease in the at least one buffer depth is performed repeatedly until a threshold is achieved for the cost function.

In an example implementation, the fourth process can create a probability distribution of the at least one buffer depth for the at least one buffer based on the at least one second buffer depth, conduct one or more second simulations based on a sampling of the probability distribution of the at least one buffer depth, rank the one or more second simulations based on a cost function, and obtain the at least one third buffer depth for at least one buffer from the one or more second simulations ranked upon occurrence of a probability distribution convergence.

At 506, the NoC can be generated based on the at least one third buffer depth.

In an example implementation, the present disclosure provides three major steps: a static analysis or characterization of buffer, a small-scale analysis (larger than link by link view), and an optimization of all the buffer depths.

In an example implementation, the present disclosure, in static analysis or characterization of buffer phase, performs a static assessment/analysis or characterization of buffer links to determine buffer depths associated with each of the buffer links.

In an example implementation, the present disclosure, in small scale analysis (larger than link by link view) phase, performs optimization on switching elements, such as but not limited to routers, bridges and the like devices.

In an example implementation, the present disclosure optimizes the buffer depths associated with the NoC, wherein, based on the optimization of the buffer depths associated with the NoC, the present disclosure configures buffer depths for designing of a NoC with optimized buffer link sizes.

Static Analysis/Characterization

In an example implementation, static analysis phase may be performed to obtain a first approximation of buffer depth required for a link. In order to obtain the buffer depth, the present disclosure, during the static analysis phase, monitors packet flow through the channels associated with the NoC. Based on monitoring of the packet flow, one or more characteristics of at least one buffer associated with the NoC can be derived. In one example, the one or more characteristics of the at least one buffer can be selected form a group of characteristics including, but not limited to, arrival rate of packets, burst size, round trip time (RTT), multicast packet size, drain rate, store and forward feature, arbitration frequency/link frequency, or any combination thereof.

In an example implementation, arrival rate can pertain to the rate at which flits (unit of data) are arriving at the buffer, for example, e.g. 100% arrival rate means that a flit arrives in each cycle, and 10% arrival rate means that a flit arrives every 10 cycles.

In an example implementation, in order to find burstiness of packet traffic on a particular link, burst size can be calculated wherein the burst size can represent the maximum number of back to back flits over an interval.

In an example implementation, round trip time (RTT) can pertain to time between the transmitter of the link sending a flit to the flit leaving the buffer and then the return of a credit upon transmission of the packet. For example, RTT associated with a transmitter of a link can be the time it takes to transmit a flit and submit a credit. RTT can have a direct impact on buffer sizing, wherein, for instance, if the time is high, then in order to maintain high throughput, there is a requirement of larger buffer depth. For example, if there is a requirement to maintain 100% arrival rate at buffer and if RTT time is 10 and if the buffer has less than 10 slots in it, then the 100% arrival rate may not be achieved as in order to get 100% arrival rate, there is requirement of a credit to send for every cycle, and, in this instance, it would take 10 cycles (RTT) to send a flit to get its credit back, and therefore the credits can be reused, making 100% arrival rate unachievable.

In an aspect, drain rate can relate to the rate at which the data drains, wherein the drain rate can be slower than the rate at which the data arrives. In an aspect, drain rate may be expressed as a function of transmitter clocks that the FIFO can inject the flit in. For example, if the transmitter is of 1 GHz, and the output is of 500 MHz, the drain rate is 50%. In the opposite scenario, the drain rate would be 100%.

In an example implementation, the store and forward feature may depend on the type of buffer, wherein many buffers are flow through, and therefore, depending on bandwidth mismatches, buffers may be configured as store and forward, which buffers accordingly require extra buffer depth to maintain certain throughput.

Upon deriving one or more characteristics of at least one buffer, aspects of the present disclosure can determine one or more buffer depths for the at least one buffer.

In an example implementation, buffer depth can be a function of the one or more above-mentioned characteristics of the at least one buffer.

In an exemplary implementation, buffer depth may be calculated as:

Bandwidth=RTT*min(arrival_rate,drain_rate)

Burst_depth=minimum(burst_size,RTT)

Extra_for_multicast=multicast_packet_size−1

Exra_for_burst=(1−drain_rate)*burst_size

Extra_for_store_and_forward=(1−drain_rate)*max_packet_size

FIFO_Depth=max(bw_depth,burst_depth)+extra_for_multicast+max(extra_for_burst,extra_for_store_and_forward)

In one implementation, the drain rate can be estimated using machine learning. The drain rate may be based on arbitration frequency/link frequency and arrival rate adjustment of the packets.

In one implementation, the aggregate drain rate can be estimated based on the number of cycles leaving a virtual channel (VC) arbitrating at a specified/particular clock frequency.

In one example implementation, buffer depths obtained in static analysis phase may be trained by a Microsimulation. During such Microsimulation, various characteristics associated with channels can be considered for finding drain rate. In one example, the drain rate can be obtained based on the input and/or output rates for each input and output for the channel. Further, the message sizes of the packet arriving at the input and/or output can also be considered for obtaining drain rate.

Small-Scale Analysis

In an example implementation, the present disclosure can include a small scale analysis (larger than link-by-link view) that can be configured to perform optimization on switching element in accordance one or more implementations. The present disclosure can, during optimization on switching element phase, derive characteristics of at least one buffer associated with the NoC. In one implementation, a packet cycle can be traced, wherein characteristics derived based on the traced packet cycle can then be passed through the Microsimulator in order to obtain output traces for one or more packets. In one example, output traces may be obtained for one or more cycles of packet communication (packet cycle), in which case, the packet cycle may be an empty cycle, or may include details of flit with respect to destination and start of packet (SOP) or end of packet (EOP).

The present disclosure, during optimization on switching element phase, can perform Microsimulation on obtained packet traces so as to measure trace skews for output traces. In one example, the trace skews can be measured based on the number of times the trace cycle had a flit and is back pressured as the cycle is not completed.

In an example implementation, the present disclosure obtains buffer depths based on trace skews measured by adjusting lengths of virtual channels (VCs). In an example implementation, lengths of VCs may be adjusted based on machine learning that may be similar to drain rate machine learning method as provided above. In one implementation, trace skews may be obtained based on length of trace input and/or output. In an example, during Microsimulation, machine learning can be applied with a desired classifier and with specific categories such as 1 m, 100 k, 10 k, 1 k.

In one implementation, trace skews may be dependent on number of cycles of trace files having trace information from boundaries of NoC for Microsimulation.

Figure 6:
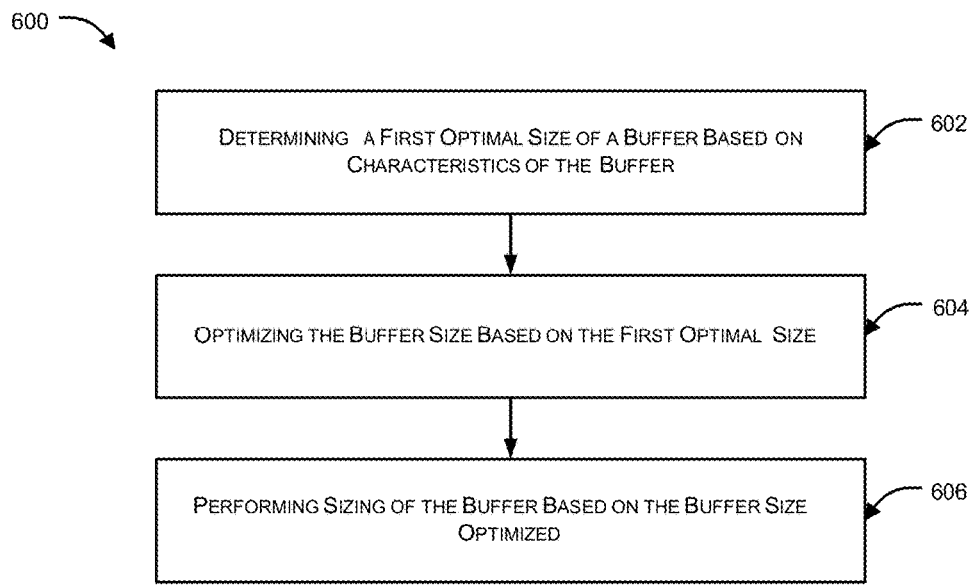
FIG. 6 illustrates an exemplary flow diagram for performing sizing of a buffer associated with a network on chip (NoC) in accordance with an example implementation.

FIG. 6 illustrates an exemplary flow diagram 600 for performing sizing of a buffer associated with a network on chip (NoC) in accordance with an example implementation. This example process is merely illustrative, and therefore other processes may be substituted as would be understood by those skilled in the art. Further, this process may be modified, by adding, deleting or modifying operations, without departing from the scope of the inventive concept.

As can be seen from the example representation of FIG. 6, at 602, a first optimal size of the buffer can be determined based on one or more characteristics of the buffer. In an example implementation, the one or more characteristics of the buffer can include, but are not limited to, arrival rate of packets, burst size, round trip time (RTT), multicast packet size, drain rate of packets, store and forward feature, and arbitration frequency/link frequency.

In an example implementation, the one or more characteristics of the buffer can be obtained based on machine learning that can be adapted to determine arrival rate of the packets and drain rate of the packets using an arbitration process of the NoC.

In an example implementation, the one or more characteristics of the buffer can be obtained based on machine learning that can be adapted to determine arrival characteristics and departure characteristics of the buffer.

At 604, buffer size can be optimized based on the first optimal size determined in 602. In an example implementation, the buffer size can be optimized by varying the buffer size for the buffer based on a cost function to attain a threshold for the cost function, wherein the cost function can be selected from any or a combination of bandwidth function or latency function or tradeoff function. Thus, the optimal size for the buffer can be obtained based on the threshold attained. In another example implementation, the buffer size can be optimized by creating a probability distribution of the buffer size for the buffer based on the first optimal size, performing one or more simulations based on sampling of the probability distribution, ranking the one or more simulations based on a cost function calculated for each simulation, wherein the cost function is selected from any or a combination of bandwidth function or latency function or tradeoff function, and obtaining the optimal size for the buffer from the simulations ranked upon occurrence of a probability distribution convergence.

At 606, sizing of the buffer can be performed based on the optimized buffer size. In an example implementation, the method 600 of the present disclosure can be used to configure a physical system on a chip (SoC) with the NoC having the buffer with optimized buffer size.

In an example implementation, the method 600 of the present disclosure can determine a second optimal size of the buffer based on at least one packet trace of a communication associated with the buffer, and thereby optimize the buffer size based on a combination of the first optimal size and the second optimal size.

Figure 7:
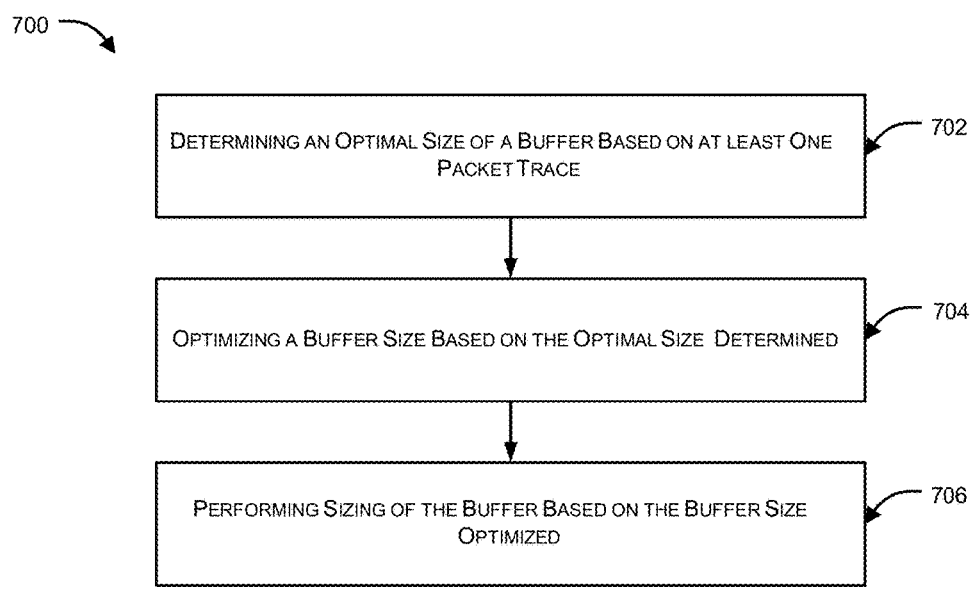
FIG. 7 illustrates an exemplary flow diagram for performing sizing for a buffer associated with NoC in accordance with an example implementation.

FIG. 7 illustrates an exemplary flow diagram for performing sizing for a buffer associated with NoC, in accordance with an example implementation. This example process is merely illustrative, and therefore other processes may be substituted as would be understood by those skilled in the art. Further, this process may be modified, by adding, deleting or modifying operations, without departing from the scope of the inventive concept.

As can be seen from the example representation of FIG. 7, at 702, an optimal size of the buffer can be determined based on at least one packet trace of a communication associated with the buffer.

In an example implementation, the at least one packet trace comprises a cycle that can be selected from any of an empty cycle, or a cycle with respect to destination and any of start of packet (SOP) or end of packet (EOP).

In an example implementation, the at least one packet trace can be obtained by performing simulation on one or more characteristics of the buffer. The one or more characteristics of the buffer can be selected from any or a combination of arrival rate of packets, burst size, round trip time (RTT), multicast packet size, drain rate of packets, store and forward feature, and arbitration frequency/link frequency.

In an example implementation, the optimal size is obtained by adjusting length of a virtual channel (VC) associated with the NoC, wherein the VC is identified based on machine learning.

At 704, buffer size can be optimized based on the determined optimal size. In an example implementation, the buffer size can be optimized by varying the buffer size for the buffer based on a cost function to attain a threshold for the cost function, wherein the cost function can be selected from any or a combination of bandwidth function or latency function or tradeoff function. Thus, the optimal size for the buffer can be obtained based on the threshold attained.

In another example implementation, the buffer size can be optimized by creating a probability distribution of the buffer size for the buffer based on the optimal size, performing one or more simulations based on sampling of the probability distribution, ranking the one or more simulations based on a cost function calculated for each simulation, wherein the cost function is selected from any or a combination of bandwidth function or latency function or tradeoff function, and obtaining the optimal size for the buffer from the simulations ranked upon occurrence of a probability distribution convergence.

In an example implementation, the simulations can be adapted to generate an input trace behavior based on historical output trace behavior associated with the NoC.

At 706, sizing of the buffer can be performed based on the optimized buffer size.

Figure 8:
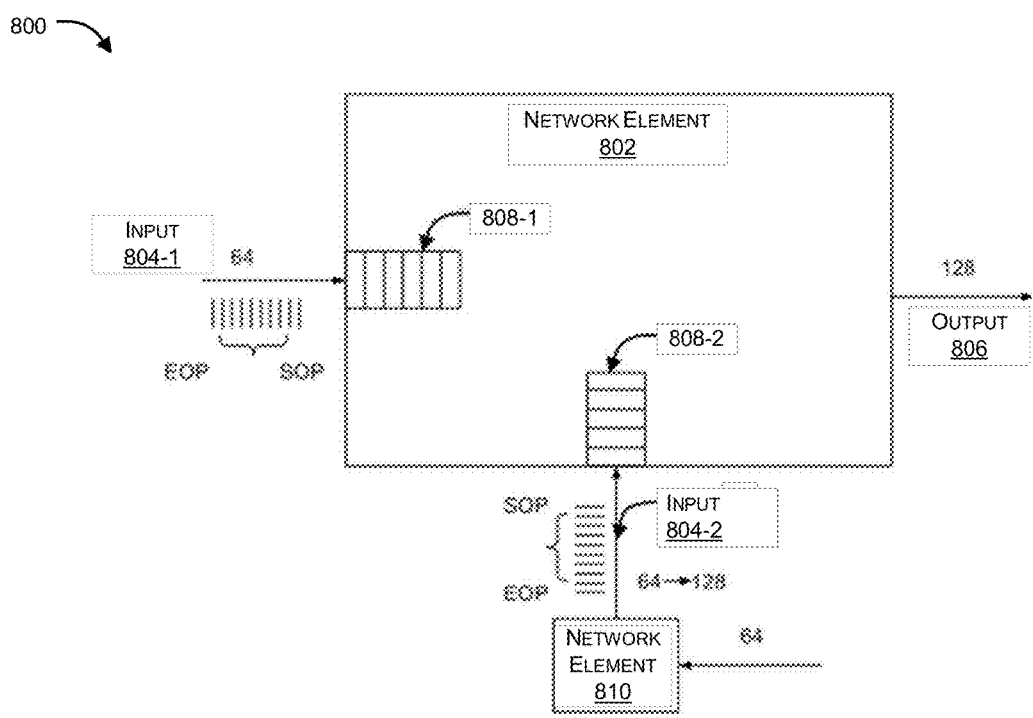
FIG. 8 illustrates an exemplary network element showing transmission of flits of packet for the calculation of the characteristics, in accordance with an example implementation.

FIG. 8 illustrates an exemplary network element showing transmission of flits of packet for calculation of characteristics in accordance with an example implementation. FIG. 8 shows a representation 800 illustrating an example network element 802 that may have a plurality of input channels, for example, channel 804-1 and channel 804-2, each of 64 bits width, collectively and interchangeably referred as input channel 804, and an output channel, for example, channel 806 of 128 bits width that is wider than the two input channels 804.

In an example implementation, traffic profile that includes details of all input and output traffic that flows at network element 802 can be analyzed to determine potential idle cycles and/or bubbles and/or characteristics at the output channel 806. Furthermore, based on the determined potential idle cycles, one of the inputs, for example input 804-1, can be marked as store and forward channel, and the other input, for example input 804-2 can be marked as a cut through channel.

In an example implementation, based on the determined potential idle cycles and/or bubbles and/or characteristics at the output channel 806, one or more of the plurality of channels marked as cut-through channels can be resized based on characteristics to achieve better utilization and throughput of network resources.

In another example implementation, based on arrival and departure characteristics of channel and/or buffer, characteristics such as but not limited to any or a combination of arrival rate of packets, burst size, round trip time (RTT), multicast packet size, drain rate of packets, store and forward feature, and arbitration frequency/link frequency can also be calculated. Such arrival and the departure characteristics according to systems and/or methods of the present disclosure can be utilized to derive buffer depth of the buffer for generation of the NoC.

One can appreciate that, based on the determined idle cycle or bubbles in the network, one or more output channels can be marked as store-and-forward channels and other output channels can be marked as cut-through channels.

Similarly, output ports of the output channels marked as store and forward channels can have dynamically configurable buffers, size of which can be changed based on observed traffic profile. Such arrival and departure characteristics according to systems and/or methods of the present disclosure can be utilized to derive buffer depth of the buffer for generation of the NoC.

In an example implementation, size of buffer can be equal to average size of packet passing through an input port or maximum size of packet for which the network may have been designed. In an example implementation, routing arbitration process can be started even when majority of flits are stored in the buffer. For example, in case of a multi flit packets of 20 flits, once the buffer has 16 flits stored in it, routing arbitration can be started because by the time the 16 flits are sent through, the input channel will receive the remaining 4 flits in the buffer and those can be sent subsequently. Such arrival and the departure characteristics according to the systems and/or methods according to the present disclosure can be utilized to derive the buffer depth of the buffer for the generation of the NoC.

Figure 9:
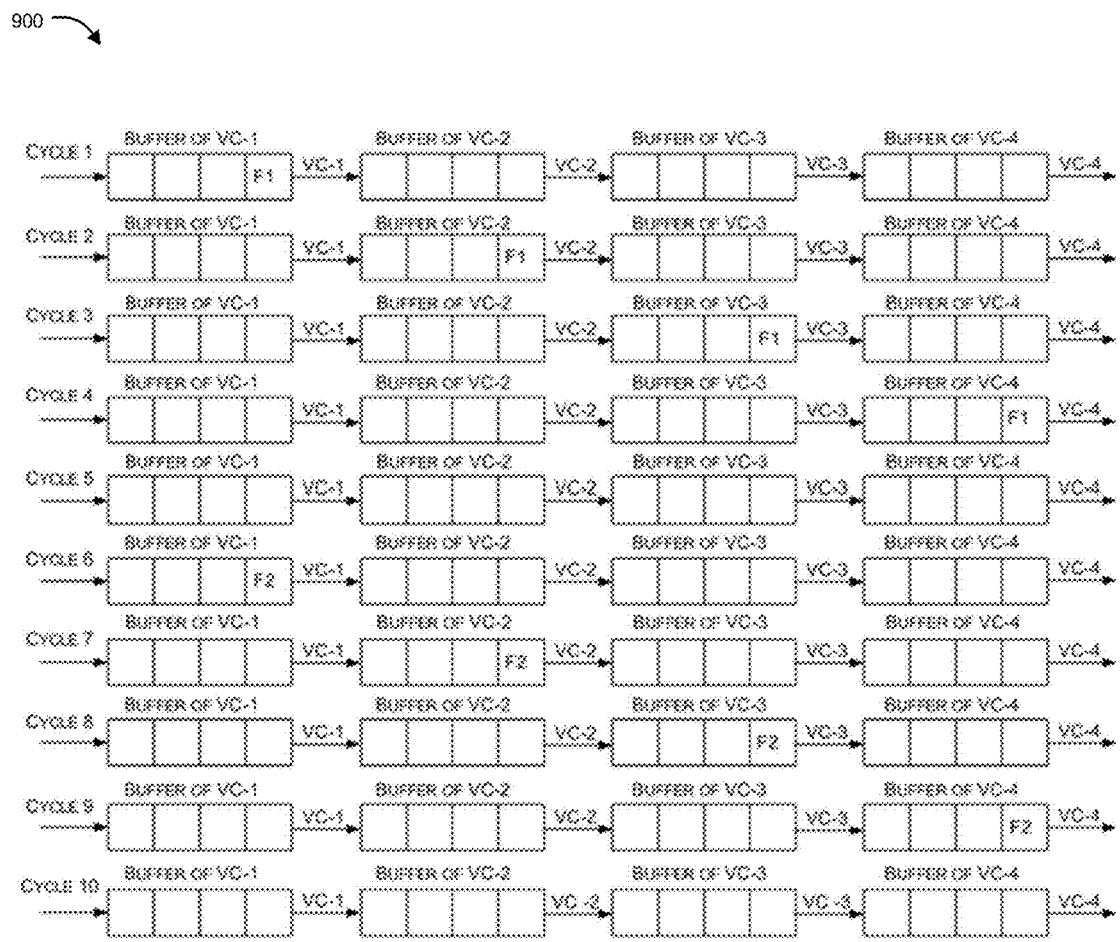
FIG. 9 illustrates an exemplary set of virtual channels for the calculation of the characteristics, in accordance with an example implementation.

FIG. 9 illustrates an exemplary set 900 of virtual channels for calculation of characteristics in accordance with an example implementation. As can be seen from the example representation of FIG. 9, four virtual channels (VC_1, VC_2, VC_3, and VC_4,) can be configured as cut-through virtual channels, wherein in cycle 1, the first channel VC_1 receives a first flit F1 of a packet, which can be immediately sent onward to VC_2, and then to VC_3 and finally to VC_4, thereby locking/engaging all the four channels. Now, in cases where the second flit F2 of the packet is received by the VC_1 after multiple cycles such as shown in FIG. 9, all the channels VC_1, VC_2, VC_3, and VC_4, having processed the first flit F1 remain engaged/locked, thereby creating idle cycles, during which the virtual channels are not processing any flit. Such arrival and the departure characteristics according to the systems and/or methods according to the present disclosure can be utilized to derive the buffer depth of the buffer for the generation of the NoC.

In an aspect of the present disclosure, in view of the above mentioned example implementation, in case one or more channels are configured as cut-through channels and face/encounter low flow rate traffic, the output VC's can get locked in sequence waiting for subsequent flits to arrive and also cannot serve/process flits of other packets. Similarly, the low rate can also be caused by the differential of clock ratios, wherein, for instance, the initial VC's (say the first output VC) working on slow clocks and subsequent VC's working on faster clocks can also cause the congestion with idle cycles being generated in the subsequent VC's. Other instances causing idle cycles/bubbles can also include instances where the transition from a first channel to a second channel is a low to high frequency transition, or narrow channel width to wide channel width transition. Similarly, in case there are bottlenecks in the upstream say due to small or no buffer, idle cycles/bubbles can be caused in the downstream. Such arrival and the departure characteristics can also be utilized according to the system and/or methods according to the present disclosure to derive the buffer depth of the buffer for the generation of the NoC.

In another aspect, bandwidth requirement can also be evaluated to determine if a cut-through channel is to be changed to a store-and-forward channel, wherein in case bandwidth requirement at a first channel is lower than the bandwidth requirement at subsequent channels, the first channel can be marked as a store-and-forward channel. In another aspect, bandwidth requirement of input channel/ output channel, traffic specification, and clock frequency can be taken into consideration while making a channel into a store-and-forward channel. For instance, if a first input channel works at 100 MHz and a second input channel works at 400 MHz, a large packet arriving at the first input channel can keep the second input channel in idle mode for a long time, and hence it becomes important to configure the first input channel as a store-and-forward channel and also configure its buffer size such that most of the packet flits, if not all, can be buffered therein. Such arrival and the departure characteristics can be utilized to derive the buffer depth of the buffer for the generation of the NoC.

In another aspect, systems of the present disclosure can also optimally size the buffers before initiating the arbitration process. For instance, in case the input channel works at 100 MHz and output channel works at 400 MHz (i.e. can transfer 4 flits per cycle), and in case the maximum packet size is expected to be 20 flits long, buffer size can be configured by the system, for example, to accommodate/store 16 flits such that by the time the 16 flits are transmitted from the output channel (in 4 cycles), the remaining 4 flits can be buffered in the buffer (at one flit per cycle). In an aspect, in case the speed of a first channel is x, and speed of a second channel is y, where x is less than y, buffer requirement can be defined by $((y-x)*(\text{maximum packet size}))/y$. Depending on the desired implementation, for a single flit packet, there may be no need of a store-and-forward channel, and the cut-through channel can thereby be maintained. In such an implementation, the traffic flow includes multi-flit packets to configure a channel as a store-and-forward channel. Such arrival and the departure characteristics according to the systems and/or methods according to the present disclosure can be utilized to derive the buffer depth of the buffer for the generation of the NoC.

In an example implementation, the present disclosure for optimization of all the buffer depths provides two different mechanisms to optimize the overall buffer links of the NoC.

Figure 10:
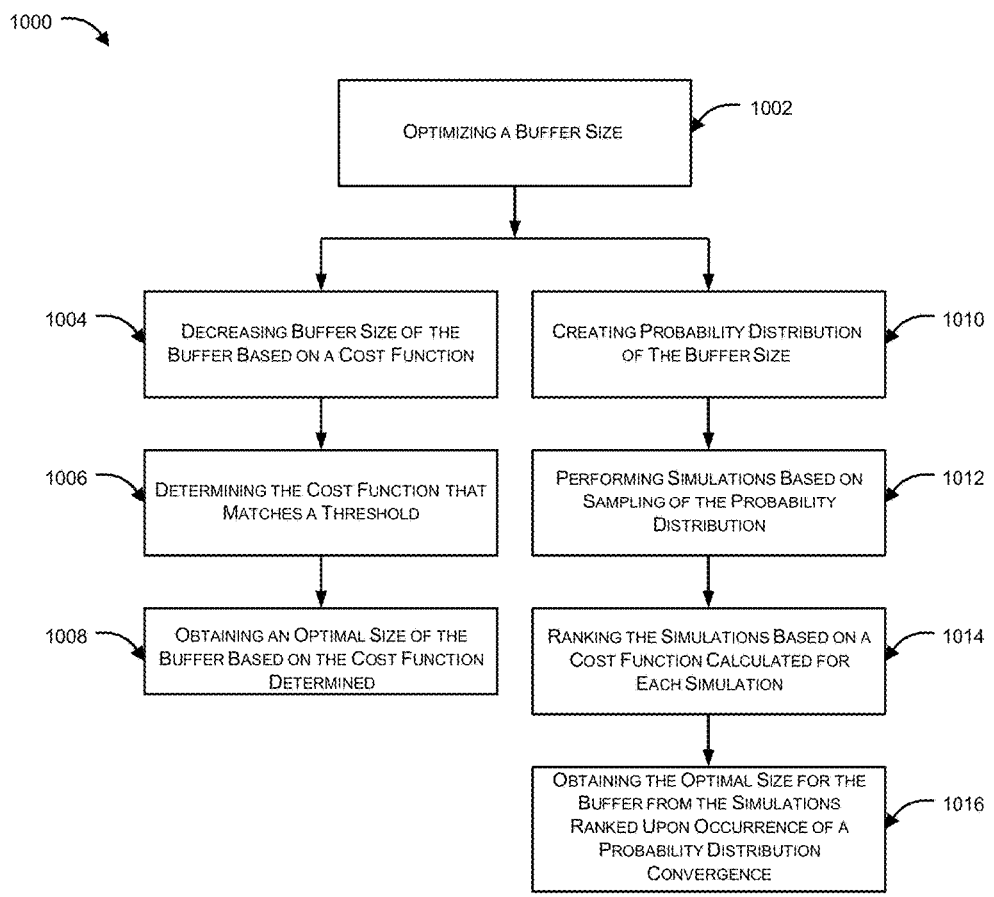
FIG. 10 illustrates an exemplary flow diagram for optimizing the buffer size, in accordance with an example implementation.

FIG. 10 illustrates an exemplary flow diagram for optimizing buffer size 1002 in accordance with an example implementation. In the method 1000, design space of function "F" vs. Cost with varying values of buffer depths is explored so as to achieve high performance values for one or more buffers.

In this method, at 1004, depth sizes of one or more respective buffers are varied, and performance simulation of the whole system can be performed along with a cost function (e.g. bandwidth function, latency function, tradeoff function, etc.). Buffer sizes/depths can be reduced by 1 unit in a brute force manner. At 1006, outputs obtained by simulations associated with each channel can be analyzed. In one implementation, top N functions can be considered and merged into one configuration.

At 1008, buffer depth sizes can be derived based on output of the varying simulations. In one implementation, depth values that match threshold pre-set/set are retained as buffer depth sizes.

FIG. 11 illustrates an example plot obtained for brute force method for optimizing buffer size in accordance with an example implementation. As shown in FIG. 11, parameter "f" represents performance parameter function such as but not limited to latency function, bandwidth function, tradeoff function between bandwidth and cost, etc. decided by the user based on performance requirement from the NoC. The parameter "c" represents the cost of switching element (based on number of buffers).

As shown in FIG. 11, buffer depths of the respective buffers can be decreased based on a cost function, wherein such decrease in depth can be conducted repeatedly until a threshold is met for the cost function.

In one implementation, based on the results obtained from simulation, a plot can be drawn by means of an algorithm or by any of exiting mechanisms or by the user so as to derive buffer depth sizes based on user requirements.

FIG. 10 also illustrates another exemplary flow diagram for optimizing buffer size 1002 in accordance with an example implementation. In this method, design space is explored by finding probability distribution of buffer depths so as to achieve high performance values for the buffers. In this method, at 1010, probability distribution of buffer depths of one or more respective buffers can be created. In one example, the probability distribution may be a Gaussian distribution with specified standard deviation, etc. Other similar techniques may be utilized to create probability distribution.

At 1012, one or more simulations can be performed based on sampling of probability distribution of buffer depths. In one implementation, configurations such as depth versus probability distribution can be obtained based on the sample distribution. At 1014, the one or more simulations can be ranked based on the cost function calculated for each of the plurality of the simulations. In one implementation, the cost function is selected from a group of performance parameters such as but not limited to bandwidth, latency, or a tradeoff function.

At 1016, optimized buffer depths for each of the one or more buffers from the plurality of ranked simulations can be obtained upon occurrence of a probability distribution convergence. In one implementation, the flow at 1010-1014 can be repeated until the result matches the probability distribution convergence.

Figure 12:
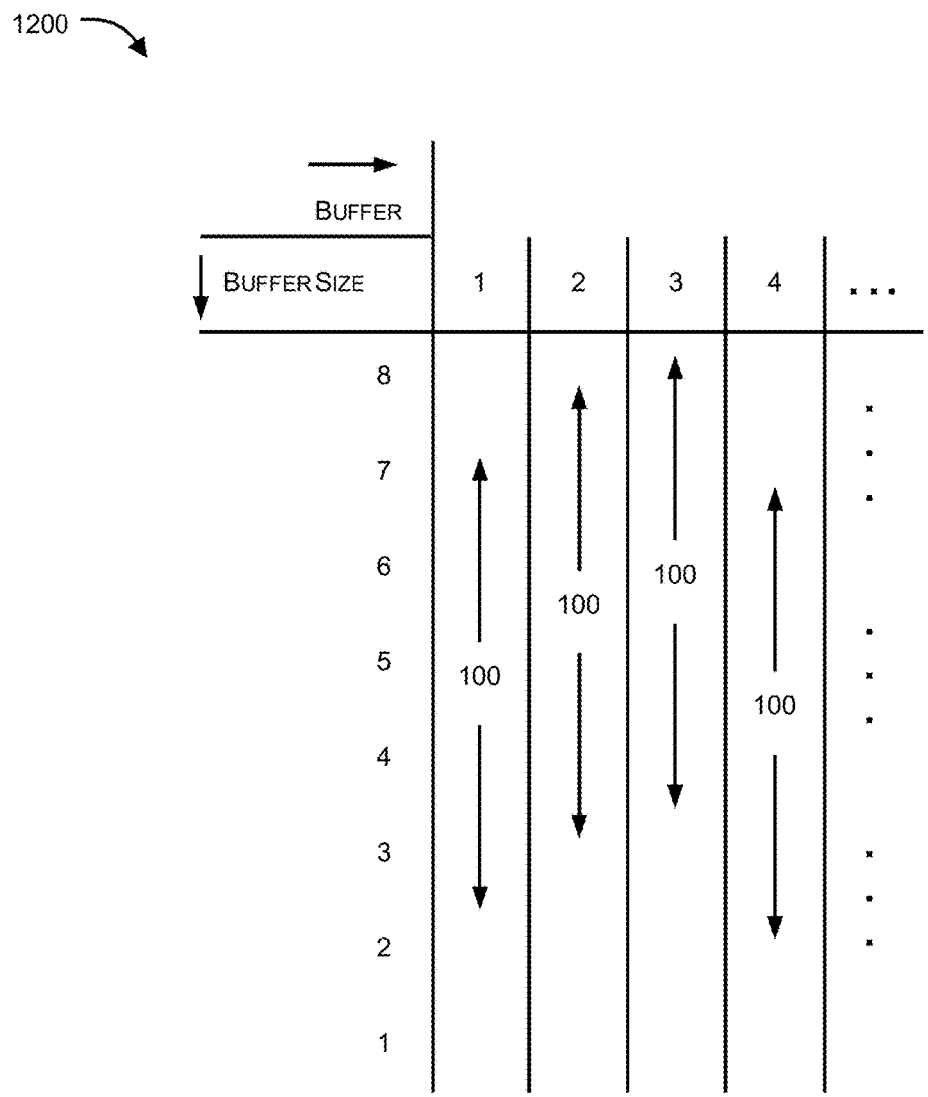
FIG. 12 illustrates an example plot obtained for cross entropy force method for optimizing the buffer size, in accordance with an example implementation.

FIG. 12 illustrates an example plot obtained for cross entropy force method for optimizing the buffer size in accordance with an example implementation. As shown in FIG. 12, probability distribution of buffer depths can be created for each of the one or more buffers based on the buffer depths. A plurality of simulations can be conducted based on sampling of probability distribution of buffer depths, wherein the plurality of the simulations can then be ranked based on a cost function. Accordingly, buffer depths are obtained for each of the one or more buffers from the ranked plurality of simulations upon occurrence of a probability distribution convergence. In an aspect, optimization of buffer links can provide buffer depth for each buffer in the NoC.

Figure 13:
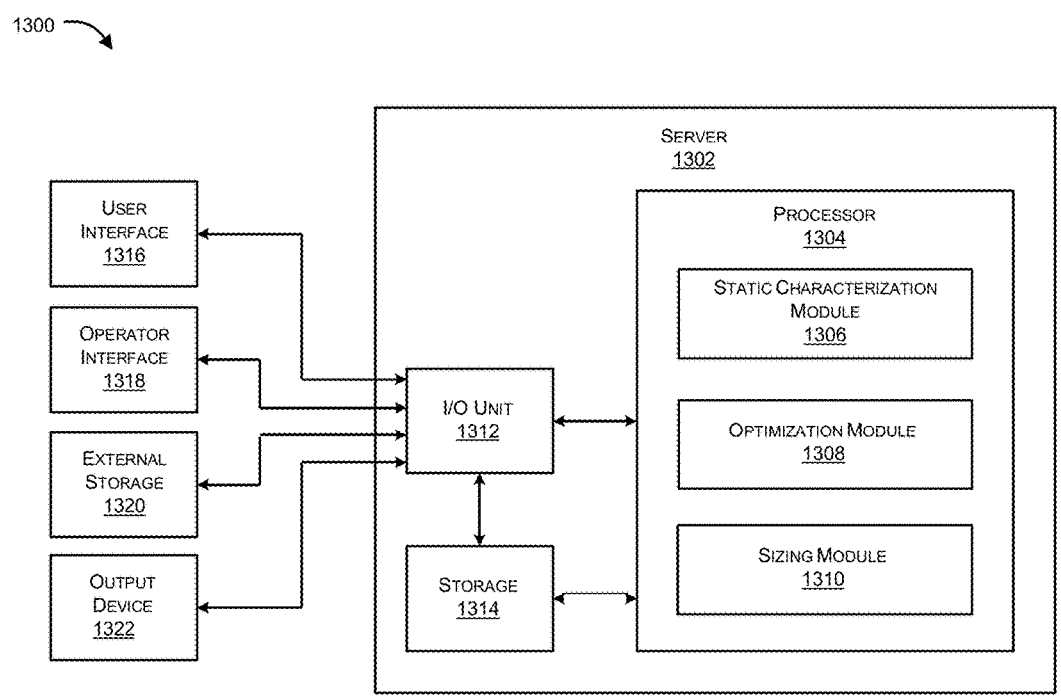
FIGS. 13 and 14 illustrate an example computer system on which example implementations may be implemented.
Figure 14:
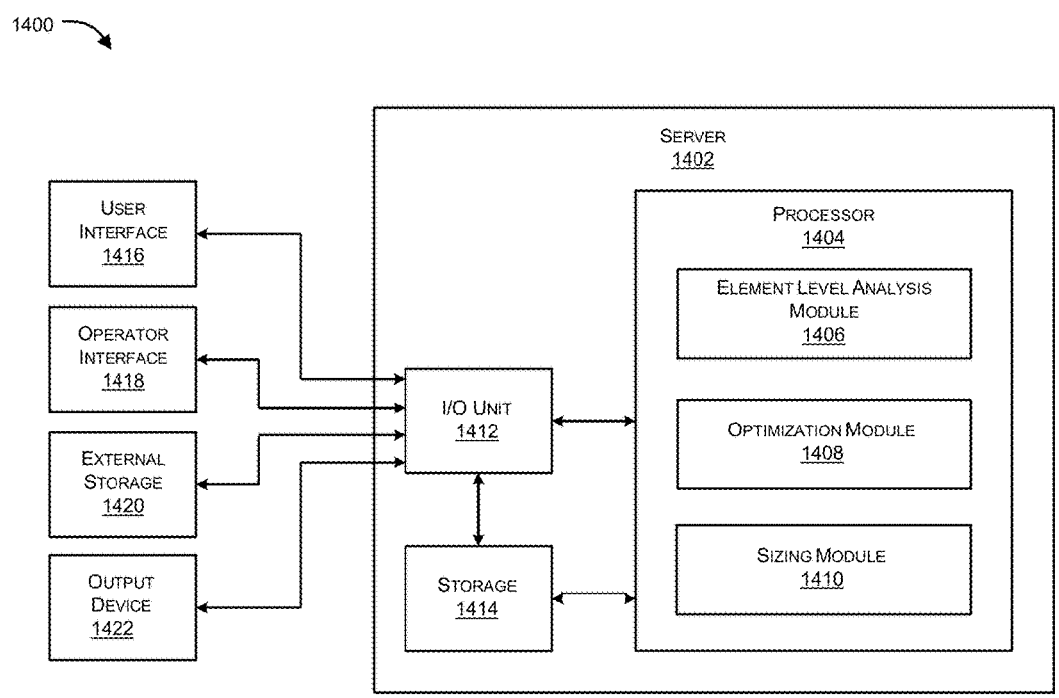

FIGS. 13 and 14 illustrate an example computer system on which example implementations may be implemented for generation of a Network on Chip (NoC). This example system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, computer system 1300/1400 includes a server 1302/1402 that may involve an I/O unit 1312/1412, a storage 1314/1414, and a processor 1304/1404 operable to execute one or more units as known to one skilled in the art. The term "computer-readable medium" as used herein refers to any medium that participates in providing instructions to processor 1304/1404 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1316/1416 and operator interfaces 1318/1418 which may utilize input devices such as a keyboard, mouse, touch device, or verbal command The server 1302/1402 may also be connected to an external storage 1320/1420, which can contain removable storage such as a portable hard drive, optical media (CD or DVD), disk media or any other medium from which a computer can read executable code. The server may also be connected an output device 1322/1422, such as a display to output data and other information to a user, as well as request additional information from a user. The connections from the server 1302/1402 to the user interface 1316/1416, the operator interface 1318/1418, the external storage 1320/1420, and the output device 1322/1422 may via wireless protocols, such as the 802.11 standards, Bluetooth® or cellular protocols, or via physical transmission media, such as cables or fiber optics. The output device 1322/1422 may therefore further act as an input device for interacting with a user The processor 1304 can include a static characterization module 1306 that can be configured to determine a first optimal size of a buffer based on one or more characteristics of the buffer, wherein the one or more characteristics of the buffer can include arrival rate of packets, burst size, round trip time (RTT), multicast packet size, drain rate of packets, store and forward feature, and arbitration frequency/link frequency. The optimization module 1308 can be configured to optimize buffer size based on the first optimal size, and the sizing module 1310 can be configured to perform sizing of the buffer based on the optimized buffer size.

In an example implementation, the processor 1304 can further include an element level analysis module that can be configured to determine a second optimal size of the buffer based on at least one packet trace of a communication associated with the buffer, wherein the optimization module 1308 can optimize the buffer size based on a combination of the first optimal size and the second optimal size.

On the other hand, processor 1404 can include an element level analysis module 1406 that can be configured to determine an optimal size of buffer based on at least one packet trace of a communication associated with the buffer. An optimization module 1408 can be configured to optimize buffer size based on the optimal size, whereas sizing module 1410 can be configured to perform sizing of the buffer based on the optimized buffer size.

In an implementation, processor 1304/1404 may execute one or more computer programs stored in memory to execute a first process that derives arrival and departure characteristics of at least one buffer associated with the NoC, execute a second process that derives at least one buffer depth of the at least one buffer based on the arrival and the departure characteristics, and one or more characteristics of the NoC, and generate NoC based on the at least one buffer depth.

In an example implementation, one or more characteristics of the NoC can include at least one trace skew, wherein the at least one second process is a machine learning based process that can be configured to select the at least one buffer depth to generate the at least one second buffer depth for optimization based on the at least one trace skew. These algorithmic descriptions and symbolic representations are the means used by those skilled in the data processing arts to most effectively convey the essence of their innovations to others skilled in the art. An algorithm is a series of defined operations leading to a desired end state or result. In the example implementations, the operations carried out require physical manipulations of tangible quantities for achieving a tangible result.

Moreover, other implementations of the present disclosure will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the disclosure being indicated by the following claims.

The invention claimed is:

1. A method for generating a Network on Chip (NoC), comprising:
executing a first process directed to derivation of arrival and departure characteristics of at least one buffer associated with the NoC;
executing a second process directed to derivation of at least one buffer depth of the at least one buffer based on the arrival and the departure characteristics and further based on one or more characteristics of the NoC; and
generating the NoC based on the at least one buffer depth;
wherein the first process is machine learning based process configured to determine arrival rate of packets and drain rate of packets based on an arbitration process of the NoC.

2. The method according to claim 1, wherein the arrival and departure characteristics are selected from any or a combination of the arrival rate of the packets, burst size, round trip time (RTT), multicast packet size, the drain rate of the packets, store and forward feature, and arbitration frequency/link frequency.

3. The method according to claim 1 further comprising:
executing a third process directed to optimize the at least one buffer depth to generate at least one second buffer depth through a first simulation of the NoC in isolation with the at least one buffer associated with the NoC; and
executing a fourth process to optimize the at least one second buffer depth to generate at least one third buffer depth through a second simulation of the NoC and at least one system element associated with the NoC;
wherein the generating the NoC based on the at least one buffer depth is based on the at least one third buffer depth.

4. The method according to claim 3, wherein the first simulation is adapted to generate an input trace behavior based on historical output trace behavior associated with at least one other NoC adjacent to the NoC.

5. The method according to claim 3, wherein the fourth process is configured to select the at least one buffer to decrease the at least one buffer depth based on a cost function, and wherein the decrease in the at least one buffer depth is performed repeatedly until a threshold is achieved for the cost function.

6. The method according to claim 3, wherein the fourth process is configured to:
create a probability distribution of the at least one buffer depth for the at least one buffer based on the at least one second buffer depth;
conduct one or more second simulations based on a sampling of the probability distribution of the at least one buffer depth;
rank the one or more second simulations based on a cost function; and
obtain the at least one third buffer depth for at least one buffer from the one or more second simulations ranked upon occurrence of a probability distribution convergence.

7. The method according to claim 3, wherein the one or more characteristics of the NoC comprises at least one trace skew, and wherein the at least one second process is a machine learning based process configured to select the at least one buffer depth to generate the at least one second buffer depth for optimization based on the at least one trace skew.

8. A system for generation of a Network on Chip (NoC), comprising:
a memory coupled to the processor, wherein the memory stores one or more computer programs executable by the processor;
wherein the computer programs are executable to:
execute a first process wherein the first process derives arrival and departure characteristics of at least one buffer associated with the NoC;
execute a second process wherein the second process derives at least one buffer depth of the at least one buffer based on the arrival and the departure characteristics and further based on one or more characteristics of the NoC;
generate the NoC based on the at least one buffer depth;
wherein the first process is machine learning based process configured to determine arrival rate of packets and drain rate of packets based on an arbitration process of the NoC.

9. The system according to claim 8, wherein the arrival and departure characteristics are selected from any or a combination of the arrival rate of the packets, burst size, round trip time (RTT), multicast packet size, the drain rate of the packets, store and forward feature, and arbitration frequency/link frequency.

10. The system according to claim 8, wherein the computer programs are further executable to:
execute a third process wherein the third process optimizes the at least one buffer depth to generate at least one second buffer depth through a first simulation of the NoC in isolation with the at least one buffer associated with the NoC; and
execute a fourth process wherein the fourth process optimizes the at least one second buffer depth to generate at least one third buffer depth through a second simulation of the NoC and at least one system element associated with the NoC;
wherein the NoC generated based on the at least one buffer depth is based on the at least one third buffer depth.

11. The system according to claim 10, wherein the first simulation is adapted to generate an input trace behavior based on historical output trace behavior associated with at least one other NoC adjacent to the NoC.

12. The system according to claim 10, wherein the fourth process is configured to select the at least one buffer to decrease the at least one buffer depth based on a cost function, and wherein the decrease in the at least one buffer depth is performed repeatedly until a threshold is achieved for the cost function.

13. The system according to claim 10, wherein the fourth process is configured to:
create a probability distribution of the at least one buffer depth for the at least one buffer based on the at least one second buffer depth;

conduct one or more second simulations based on a sampling of the probability distribution of the at least one buffer depth;

rank the one or more second simulations based on a cost function; and obtain the at least one third buffer depth for at least one buffer from the one or more second simulations ranked upon occurrence of a probability distribution convergence.

14. The system according to claim 8, wherein the one or more characteristics of the NoC comprises at least one trace skew, and wherein the at least one second process is a machine learning based process configured to select the at least one buffer depth to generate the at least one second buffer depth for optimization based on the at least one trace skew.

15. A non-transitory computer readable storage medium storing instructions for executing a process, the instructions comprising:

executing a first process directed to derivation of arrival and departure characteristics of at least one buffer associated with the NoC;

executing a second process directed to derivation of at least one buffer depth of the at least one buffer based on the arrival and the departure characteristics and further based on one or more characteristics of the NoC; and generating the NoC based on the at least one buffer depth, wherein the first process is a machine learning based process configured to determine arrival rate of packets and drain rate of packets based on an arbitration process of the NoC.

16. The non-transitory computer readable storage medium according to claim 15, wherein the arrival and departure characteristics are selected from any or a combination of the arrival rate of the packets, burst size, round trip time (RTT), multicast packet size, the drain rate of the packets, store and forward feature, and arbitration frequency/link frequency.

17. The non-transitory computer readable storage medium according to claim 15, the instructions further comprising:

executing a third process directed to optimize the at least one buffer depth to generate at least one second buffer depth through a first simulation of the NoC in isolation with the at least one buffer associated with the NoC; and executing a fourth process to optimize the at least one second buffer depth to generate at least one third buffer depth through a second simulation of the NoC and at least one system element associated with the NoC;

wherein the generating the NoC based on the at least one buffer depth is based on the at least one third buffer depth.

18. The non-transitory computer readable storage medium according to claim 17, wherein the first simulation is adapted to generate an input trace behavior based on historical output trace behavior associated with at least one other NoC adjacent to the NoC.

19. The non-transitory computer readable storage medium according to claim 17, wherein the fourth process is configured to select the at least one buffer to decrease the at least one buffer depth based on a cost function, and wherein the decrease in the at least one buffer depth is performed repeatedly until a threshold is achieved for the cost function.

20. The non-transitory computer readable storage medium according to claim 17, wherein the fourth process is configured to:

create a probability distribution of the at least one buffer depth for the at least one buffer based on the at least one second buffer depth;

conduct one or more second simulations based on a sampling of the probability distribution of the at least one buffer depth;

rank the one or more second simulations based on a cost function; and obtain the at least one third buffer depth for at least one buffer from the one or more second simulations ranked upon occurrence of a probability distribution convergence.

21. The non-transitory computer readable storage medium according to claim 17, wherein the one or more characteristics of the NoC comprises at least one trace skew, and wherein the at least one second process is a machine learning based process configured to select the at least one buffer depth to generate the at least one second buffer depth for optimization based on the at least one trace skew.

* * * * *